United States Patent Office 3,048,560
Patented Aug. 7, 1962

3,048,560
POLYSPIRANE RESIN CURED IN THE PRESENCE OF AN ACID CATALYST, MIXTURES THEREOF WITH OTHER RESINOUS MATERIALS, PROCESS FOR PREPARING SAME, AND ELECTRICAL CONDUCTOR COATED THEREWITH
Albert H. Markhart, Wilbraham, and Charles F. Hunt and Saul M. Cohen, Springfield, Mass., assignors to Shawinigan Resins Corporation, Springfield, Mass., a corporation of Massachusetts
No Drawing. Filed Aug. 7, 1958, Ser. No. 753,622
10 Claims. (Cl. 260—42)

This invention pertains to an organic resin composition. More specifically it pertains to a novel organic material comprising of a modified polyspirane composition which is particularly suitable for electrical conductor insulation, the method of manufacture of such conductor insulation, and the use of such conductors having this insulation material thereon.

It has been well known in the art to apply resin coatings to electrical conductors for the purpose of electrically insulating such conductor from its surroundings. Both organic and inorganic coating materials have been used depending upon such factors as temperature service, particular atmospheric exposure and the mechanical manipulations which the coated wire must withstand either in the fabrication of the electrical device or its subsequent service.

The use of certain cured polyspiranes for this application has been described in the copending application of C. F. Hunt, E. Lavin and A. H. Markhart, Serial Number 754,173, filed August 11, 1958. We have found that although the compositions listed therein offer substantially improved physical and chemical properties over polyvinyl formal-phenolic resins certain other advantages can be gained by utilizing other type curing agents for the polyspirane resin. The suitable curing agents described in the preceding mentioned application were organic materials comprising polycarboxylic acid anhydrides and certain polymers containing anhydride groups, which class of materials is not only generally unavailable in large quantities but where available has the economic disadvantage of generally being expensive. An additional economic disadvantage found with the use of curing agents for polyspirane resins of the type described is that relatively large quantities of from 5–25 weight percent of the curing agent (based on the solid, resinous product) are required to fully cure the resin. With most of the curing agents in the present invention an amount of less than 1% of the curing agent on the same basis is adequate to cure the resin.

The particular physical and chemical properties which the insulation in the present application possesses are substantially superior heat stability, cut-through temperature and solvent resistance. Such a combination of improved properties in insulation is certainly surprising as well as desirable. But the curing agents in the present invention impart an additional benefit to the final resinous product over those curing agents disclosed in the above copending application, Serial Number 754,173. The benefit is a more heat stable composition at elevated temperature as measured by the weight loss of a cured polyspirane resin held at a particular temperature for an extended period. The improved properties of polyspirane resins cured with these materials will be further illustrated in succeeding examples and in subsequent discussions thereon.

The primary object of this invention is the provision of an organic resin composition particularly suitable for wire enamel coatings having suitable stability both at high and low temperatures. Another object of this invention is to provide a resinous film, which at high temperatures, maintains its characteristics of being continuous, hard, flexible, abrasion resistant and solvent resistant.

The objects of this invention can be accomplished by using as the resin composition a polyspirane resin containing certain mono and polyhydric acids incorporated therein as curing agents alone or in combination with other polymers in order to impart certain special chemical and physical properties which may be desired.

A polyspirane containing the type of curing agents mentioned possesses the very desirable properties which makes it an excellent dielectric and can be produced in film form without the aid of other polymer materials. The addition of other polymer materials however can improve certain of these properties as will be shown in later examples.

The particular polyspirane that is acceptable in the practice of this invention can be represented by the following formula:

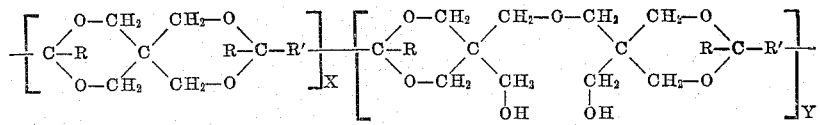

where R is taken from the group consisting of hydrogen and methyl groups, R' is taken from the group consisting of the aliphatic hydrocarbons defined by $(CH_2)_S$, where S is an integer from 0–8 carbon atoms and alicyclic and aromatic hydrocarbons of 5–6 carbon atoms and derivatives thereof, $X+Y$ is equal to an integer from 2 to 100 and Y is an integer equal to no more than 50% of $X+Y$. The acceptable molecular weight range for this invention is 400–20,000.

The class of acidic materials that is useful in the present invention as a curing agent for the polyspirane resins is very broad and includes both organic and inorganic acids. The reason for the suitability of such a broad class of acidic materials is believed to be the principal function of the acid radical in the resin cure, namely that of a catalyst in promoting crosslinking between reactive groups of different chains in the resin. The class of suitable acidic curing agents will be more clearly defined in the succeeding examples and in subsequent discussions thereon.

The addition of other polymer materials to a polyspirane containing the acidic curing agent improves certain physical and chemical properties of the resin product dependent largely upon the composition of the particular polymer added. Although only certain phenolic resins, epoxy resins and polyurethanes were used in combination with the polyspirane-curing agent compositions, it is believed that other resin additives and combinations thereof would also be suitable to enhance desirable properties. The effect of the various polymer additives on physical and chemical properties of the polyspiranes will be described in the following examples.

The invention is practiced in a specific embodiment as illustrated in the following examples but is not limited thereto.

EXAMPLE 1

*Preparation of the Poly(Glutardiylidene Pentaerythritol) Resin*

480 gms. of technical pentaerythritol, which is a mixture of 88 parts by weight of the mixture of monopentaerythritol and 12 parts of dipentaerythritol is charged to a 5 liter flask equipped with a reflux column along with 1384 gms. of a 24% by weight aqueous solution of glutaraldehyde having a pH in the range 2.5–4.0 and in addition 1200 gms. of distilled water. The mixture is heated to reflux and the contents stirred by which time the pentaerythritol has all dissolved. The catalyst, 7.4 gms. of oxalic acid, a water soluble organic acid, is added to the boiling solution. Within a period of five minutes after the addition of the acid catalyst, insoluble resin particles have already formed. The reaction is substantially completed within two hours. The resin is then filtered, washed with water until neutralized and dried. The resin is a white powder with a melting point of at least 200° C.

The quantitative analysis for the carbon, hydrogen, and oxygen content of the compound yielded 58.4%, 8.2%, and 33.4% respectively, which is in close agreement with the theoretical values for the compound.

*Preparation of the Wire Enamel*

For the preparation of the wire enamel the following procedure is used:

Into a 2 liter round-bottomed flask equipped with a stainless steel condenser and a motor driven stirrer is placed 488 ml. of cresylic acid and 155 ml. of naphtha. To the solvent mixture is added 120 gms. of poly(glutardiylidene pentaerythritol). The contents are then stirred, heated to 50–100° C. and held in that temperature range for approximately 1–5 minutes, at which time the heating is discontinued. 0.19 gm. of p-toluenesulfonic acid is added directly to the resin batch with continued stirring. After solution of the curing agent the stirring is discontinued and the hot resin solution is then filtered through a Buchner funnel lined with felt and into the final enamel container.

The wire enamel prepared in Example 1 was applied to No. 18 magnet wire and subjected to the standard tests of acceptance for this application. The wire enamel was applied to the wire and cured with heat by conventional means. The following data in Table 1 represents the comparative results of thermal properties tests between the polyspirane-p-toluenesulfonic acid coating, a polyspirane-pyromeletic dianhydride coating such as described in copending application Serial No. 754,173, filed August 11, 1958, and a coating of polyvinyl formal-phenolic resin applied to the same size wire in the same manner.

TABLE 1

| Type sample | Build (mils) | Cut-through temp. ° C. | Percent weight loss of coating at 160° C. for 39 hours |
|---|---|---|---|
| Polyspirane-p-toluenesulfonic | 2.9 | 275 | 4.8 |
| Polyspirane-pyromelletic | 2.8 | 270 | 11.3 |
| Polyvinyl formal-phenolic | 2.8 | 221 | 8.3 |

The cut-through temperature is an A.I.E.E. (American Institute of Electrical Engineers) test for thermal plastic flow whereby crossed coated wires are mechanically loaded while the ambient temperature is raised until electrical contact is made between the metallic substrate of the wires.

It can be observed from the data in Table 1 that the polyspirane-p-toluenesulfonic acid resin performance was superior to both the polyspirane-pyromellitic dianhydride resin and the polyvinyl formal-phenolic resin in the thermal properties shown.

The above polyspirane coatings cured with p-toluenesulfonic acid possessed excellent resistance to the action of the usual solvents utilized to test the chemical stability of an electrical insulating film. When the film was subjected to a 16 hour immersion in liquefied mono-chlorodifluoromethane, no blisters were found and weight percent of the film extracted was very low. Immersion of the film in both boiling methanol and boiling toluene for a period of two hours in each of the liquids resulted in very low weight percent extractibles.

*Example 2*

The same procedure is followed as described in Example 1 for both the preparation of the polyspirane resin and the wire enamel except that in substitution for the p-toluenesulfonic acid used in the latter preparation, 0.12 gm. of concentrated sulfuric acid (92.5% $H_2SO_4$) is used and 3 gms. of salt-free poly(tetrafluoroethylene) as a 65% by weight aqueous dispersion is added to the cooling resin batch after the sulfuric acid addition. The poly(tetrafluoroethylene) is added while stirring the enamel batch.

*Example 3*

The same procedure is followed as described in Example 1 for both the preparation of the polyspirane resin and the wire enamel except that in substitution for the polyspirane resin prepared in the manner heretofore described, 150 gms. of poly(glutardiylidene pentaerythritol) prepared with a nonionic emulsifier is used.

The preparation of the poly(glutardiylidene pentaerythritol) used in the present example is as follows:

294 gms. of glutaraldehyde is reacted with 423 gms. of a mixture of pentaerythritols, the mixture containing 88% by weight of the mixture of monopentaerythritol and 12% of dipentaerythritol. The glutaraldehyde-pentaerythritol mixture is added to 2040 ml. of distilled water and the contents heated to reflux in the presence of 35.9 gms. of an nonionic emulsifier, consisting of a copolymer of ethylene oxide and propylene oxide. 12.2 gms. of hydrogen lauryl sulfate catalyst is added to initiate the reaction after reflux is achieved. The resin is then filtered, washed with water until neutralized and dried. The resin is a white powder with a melting point of at least 250° C.

*Example 4*

The same procedure is followed as described in Example 1 for both the preparation of the polyspirane resin and the wire enamel except that in substitution for the polyspirane resins prepared in the manner heretofore described, 150 gms. of poly(malondiylidene pentaerythritol) prepared in the following manner is used:

Into a 5 liter, 3-necked, round-bottomed flask equipped with a motor driven stirrer, dropping funnel and stillhead, thermometer, and connecting condenser, 169 gms. of pentaerythritol is added, followed by 932 gms. of dry benzene. Next 256 gms. of the triethyl, monomethyl diacetal of malonaldehyde is added to the reaction mixture followed by 4.2 gms. of p-toluenesulfonic acid. The reaction mixture is heated in a water bath maintained at 80–85° C. for approximately 2 hours until substantially all of the alcohol-benzene azeotrope with a boiling range of 55–72° C. has been distilled off. At this time 1745 gms. of cresylic acid is added to the reaction mixture along with a further 8.4 gms. of p-toluenesulfonic acid. The reaction mixture is then stirred at 80–90° C. until substantially all of the benzene-alcohol remaining in the reaction mixture are distilled off. A slight vacuum will aid distillation. The reaction mixture is then cooled, neutralized, diluted with 4 liters of water, and filtered for the isolation of the resin product. The resin after drying is a cream colored powder with a melting point of at least 300° C.

*Example 5*

The same procedure is followed as described in Example 1 for both the preparation of the polyspirane resin and the wire enamel except that in substitution for the poly(glutardiylidene pentaerythritol), 150 gms. of poly(terephthaldiylidene pentaerythritol) prepared in the following manner is used:

Into a 3 liter, 3-necked, round-bottomed flask equipped with a reflux column is charged 158 gms. of pentaerythritol along with 780 gms. of a 20% by weight solution of a terephthaldehyde in hot water and an additional 600 gms. of water. The mixture is heated to reflux and the contents stirred by which time the pentaerythritol has all dissolved. The catalyst 0.8 gm. of formic acid, a water soluble organic acid, is added to the boiling solution. The reaction is substantially completed within two hours. The resin is then filtered, washed with water until neutralized and dried. The resin is a white powder with a melting point of at least 300° C.

*Example 6*

The same procedure is followed as described in Example 1 for both the preparation of the polyspirane resin and the wire enamel except that in substitution for the poly-(glutardiylidene pentaerythritol) 150 gms. of the copolymer product of equimolar portions of glutaraldehyde and 3-methyl glutaraldehyde and the pentaerythritol mixture is used and in substitution for the 488 ml. of cresylic acid and 155 ml. of naphtha is used 214 ml. and 429 ml. respectively in the preparation of the wire enamel.

*Example 7*

The same procedure is followed as described in Example 1 for both the preparation of the polyspirane resin and the wire enamel except that in the latter preparation, 30 gms. of the phenol adduct of the reaction product between 1 mol of trimethylol propane and 3 mols to tolylene diisocyanate is added to the cooling enamel batch following the p-toluenesulfonic acid addition and before the filtration steps shown therein. The polyurethane is dissolved in a 50% by weight solution of equal weight portions of cresylic acid and naphtha before the addition to the enamel batch and is added to the latter with some stirring.

Wire samples made up of the heat cured product from the above batch in contrast to like samples made up from a batch containing the p-toluenesulfonic acid but not containing the polyisocyanate had an improved wet dielectric strength of over 1000 volts/mil. in comparison with the latter.

*Example 8*

The same procedure is followed as described in Example 1 for both the preparation of the polyspirane resin and the wire enamel except that in the latter preparation, 15 gms. of a meta-para-cresol-formaldehyde condensation product is added to the cooling enamel batch with some stirring following the p-toluenesulfonic acid addition and before the filtration steps shown therein.

Wire samples made up of the heat cured product from the above batch in contrast to like samples made up from a batch containing p-toluenesulfonic acid but not containing the meta-para-cresol formaldehyde condensate had an improved 1 kv.-life at 240° C. more than twice that of the latter.

*Example 9*

The same procedure is followed as described in Example 1 for both the preparation of the polyspirane resin and the wire enamel except that in the latter preparation, 0.30 gm. of p-toluenesulfonic acid is substituted for the 0.19 gm. used in Example 1 and 50 gms. of an epoxy resin is added to the batch with some stirring thereafter but before the filtration step.

Wire samples made up of the heat cured product from the above batch in contrast to like samples made up from a batch containing the same amount of p-toluenesulfonic acid but not containing an epoxy resin had an improved wet dielectric strength of over 1500 volts/mil. in comparison with the latter.

*Example 10*

The same procedure is followed as described in Example 1 for both the preparation of the polyspirane resin and the wire enamel except that in the latter preparation, 0.30 gm. of trichloroacetic acid is substituted for the 0.19 gm. of p-toluenesulfonic acid used in Example 1.

Other polyspiranes are suitable for the practice of this invention than those specifically shown in the examples and whose formulations will be obvious to the man skilled in the art after the following discussion. The dialdehyde component of the resin can be selected from the group consisting of (a) succinaldehyde, glutaraldehyde, suberic dialdehyde, azaleic dialdehyde, sebacic dialdehyde and mixtures thereof, (b) cyclopentanedial, cyclohexanedial, phthalic aldehyde and mixtures thereof, (c) mixtures of (a) and (b), (d) methyl and ethyl diacetals of malonaldehyde, succinaldehyde and glutaraldehyde, methyl and ethyl diketals of 2,4-pentanedione, 2,5-hexanedione and 2,6-heptanedione, and mixtures thereof, and (e) methyl and ethyl substituted products of (a) and (d). The pentaerythritol component of the polyspirane condensation product can be (a) pentaerythritol, or (b) a material taken from the group consisting of pentaerythritol and mixtures of pentaerythritol with dipentaerythritol containing up to 50% dipentaerythritol by weight of the mixture. Acid catalysts suitable for the polyspirane reaction can be either inorganic acids such as hydrochloric, sulfuric and phosphoric acids or organic types such as oxalic, p-toluenesulfonic or formic acids. The acid concentration is not critical during the polymerization reaction. The preferred concentration of the polyspirane resin is 50–99.95% by weight of the solid resinous insulation.

The class of acidic curing agents which is suitable for the polyspiranes of the present invention is a very large one including certain monofunctional and polyfunctional organic and inorganic acids. The particular property which distinguishes a suitable acid curing agent from other compounds is that it be a strong acid at the elevated temperatures used to cure the polyspirane resin in the present invention. It is obvious therefore that the volatility of a suitable acidic material not be so great at elevated temperatures that the particular curing agent will have been removed before it can operate as a catalyst for the cure reaction. The class of suitable acids can be distinguished in that all included acids have an ionization constant of greater than $3.8 \times 10^{-2}$. An additional limitation which can be imposed upon curing agents used in the type of wire enamel system disclosed in the present invention is that they be soluble in the particular solvent system employed. The preferred concentration of the acid catalyst is .05–1.0% by weight of the polyspirane used.

The class of monofunctional organic acid curing agents include both sulfonic acids and carboxylic acids. The type of suitable carboxylic acids comprise the halogenated aliphatic acids of which trichloracetic acid is representative. The class of sulfonic acids that is suitable for the practice of the present invention include the alkyl-sulfonic acids and the aryl-sulfonic acids. Examples of suitable acids within each group are methylsulfonic acid and p-toluenesulfonic acid. Such a large class of sulfonic acids is utilizable because these acids are comparable in acid strength to sulfuric acid.

The class of inorganic acids that is suitable for the practice of this invention includes both mono- and polyhydric acids of which hydrochloric acid and sulphuric acid and pyrophosphoric acid are typical.

The preferred range of concentration of the curing agent in the final resin product is 0.05–1.0% by weight, although compositions containing higher concentrations are permissible in electrical insulation applications, so long as such concentrations do not materially lower the dielectric properties of the resin product. It is obvious that mixtures of the acidic curing agent materials already described heretofore are suitable for the practice of this invention.

As was disclosed in the preceding examples, certain of the physical properties of the heat-cured polyspirane resin films were improved by the addition to the wire enamel of other polymeric materials. The specific polymers added were selected from the group consisting of polyisocyanates, phenolic resins and epoxy resins.

The reaction product of the above polymeric material and a polyspirane is formed during the cure reaction.

Other isocyanates are also suitable for the practice of this invention as substitutes for the particular one used in Example 7. They can be limited generally to those having two or more isocyanate groups essentially all of which reactive groups being blocked or hindered from immediate reaction by a previous reaction with a phenolic type modifier. The blocked isocyanates useful in this invention are polyurethanes which on heating from 100–250° C. yield a polyisocyanate. Other suitable polyisocyanates include compounds such as phenylene diisocyanates, tolylene diisocyanates, naphthalene diisocyanates, diphenylmethane diisocyanates, cyclohexanediol diisocyanates, ethylene diisocyanates, tetramethylene diisocyanates, hexamethylene diisocyanates, methylbenzene triisocyanates, polyisocyanates which are the reaction products of diisocyanates with polyhydric alcohols, and the like, and mixtures thereof.

The phenolic resins which are useful in the present invention can be limited to those soluble in the solvent systems employed for the preparation of the wire enamels. Such can readily be selected from the general class of phenolic-aldehyde resins.

The phenolic portion of the resin in addition to the meta-para-cresol used in Example 8 may also be selected from the group consisting of xylenols, mixtures of phenol and cresol, mixtures of phenol, cresol and wood oil phenolic bodies, petro-alkyl phenols, coal-tar phenol and others. The aldehyde portion of the resin in addition to the formaldehyde used in Example 8 may also be paraformaldehyde or other suitable aldehydes. The preferred composition of phenolic-aldehyde resin useful in this invention is obtained by reacting 1 mol of the phenolic compound with 0.7 to 2.0 mols of the suitable aldehyde.

The epoxy resins which are preferred in the practice of the invention are those which can be represented by the following general formula:

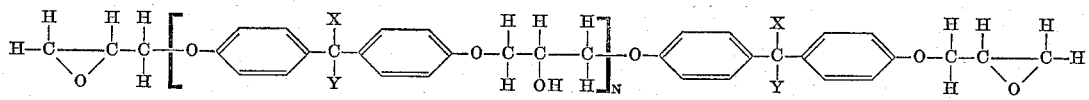

where X and Y are taken from the group consisting of hydrogen, methyl groups and aliphatic and aromatic hydrocarbons and N is an integer from 0 to 10.

Both ionic and nonionic emulsifiers are suitable for the preparation of the polyspirane resin. The purpose of the emulsifier in the resin preparation is to increase the molecular weight of the resin by keeping it in contact with the reaction medium for a longer period of time than would ordinarily occur due to the general insolubility of the resin in an aqueous system. Suitable ionic emulsifiers would be sodium lauryl sulfate and di-cocodimethylammonium chloride. The emulsifier is useful in the preparation in a weight range of 0.1–10% of the combined weight of the aldehyde and pentaerythritol mixture used in the resin.

The naphtha solvent used in the preparation of the wire enamels is an aromatic liquid hydrocarbon of boiling range 150–184° C., derived from coal tar and/or petroleum. Other solvents which are suitable as diluents for the cresylic acid in the preparation of the wire enamels in this application are substituted and unsubstituted aromatic liquid hydrocarbons such as chloro-benzene, toluene and cumene and such other solvents as furfuryl alcohol and furfural. The acceptable total solids range for wire enamels in this invention is 5 to 40% total solids.

The cresylic acid that is useful in the wire enamel preparation is a liquid phenolic compound consisting of primarily xylenols and cresols and having a boiling range of 195–227° C.

The poly(tetrafluoroethylene) used in Example 2 is commercially available. Suitable substitutes for this material in the practice of the invention are the polymers of ethylene and the halogenated derivatives thereof. The presence of 0.5–5% by weight of these additives in the solid resinous product improves the abrasion resistance of the films made therefrom.

The curing temperature required to obtain a continuous hard film for an acid cured polyspirane resin not containing solvents or other additives is limited to a temperature above the melting point of the particular resin used. At this temperature the acid material will have already catalyzed the cure reaction of the resin.

The coating compositions used in the preceding examples impose other limitations upon the curing temperature of the final resin product dependent upon such factors as the relative volatility of the particular solvent used and the reactivity of any other particular additive. Such other commercial factors as the type of curing equipment to be used and the desired time to complete the curing reaction will also influence the cure temperature selected. For the compositions in the preceding examples a standard commercial type wire enamel tower was utilized, wherein operating temperatures of 300° C. to 400° C. were employed.

The exact curing temperatures of the above cured cross-linked films themselves were not determined during the wire tower runs. Even though the curing step was found to be a critical factor in producing good films, obtaining these temperatures is extremely difficult to do in such an apparatus because of the continuous travel of the coated wire thru the tower during the curing process. Curing temperatures were obtained, however, for films of the composition disclosed in Example 1 and of 0.001–0.005 of an inch thickness in an air circulated oven for various curing periods and the properties of the cured films determined. Such films cured at 240° C. for periods of ½, 1, 2, 3, 4 and 5 hours did not have the flexibility of fully cured polyspirane systems. When the cure temperature was raised to 300° C., however, the films cured for a 10 minute period gave the acceptable flexibility and solvent resistance noted above. It is not intended to limit the curring temperature of the films in the present invention to a minimum of 300° C. by the above discussion, but rather to say that the cure temperature is greater than 240° C. It is also obvious from the above discussion that both, the proper cure temperature and time of cure can be determined experimentally for the particular polyspirane system employed.

It is to be understood that this invention is not limited to the particular wire coating or wire size described above. It is obvious from the above test results that a wire coated with the acid cured polyspirane enamel alone will be acceptable for elevated temperature service operation. But it is also obvious to the man skilled in the art to modify the application of the enamel so as to upgrade its high temperature usefulness by means of known practices in the field. It is possible for instance to utilize the present coating as an undercoat on a wire and to apply as an overcoat one or more of the many compatible insulating varnishes and thereby obtain a coating suitable for even higher temperature operation. It is also not intended to limit the application of the resin as an electrical insulation for wire merely. It is possible by means of extrusion, dipping, casting and other known means to form insulation from this material that is useful in such electrical applications as slot liners, encapsulation, sheet insulation, and surface coatings. The resins can also be used as an adhesive agent in the bonding of electrical parts that expect use at elevated temperatures. Further use can be made of the invention as insulation and/or impregnating varnishes for such articles as glass tapes and electrical coils. Other non-electrical uses of this resin are apparent where chemical resistance and temperature stability of the final product are needed, such as surface coatings, adhesives and others.

In addition to the various applications for which this resin is particularly suitable as herein before described, it will be obvious to the man skilled in the art that not only other applications are apparent but that other compositions or other processes for the manufacture of those compositions are likewise within the scope of this invention.

What is claimed is:

1. A composition of matter comprising a crosslinked insoluble product of a polyspirane resin, having the general formula

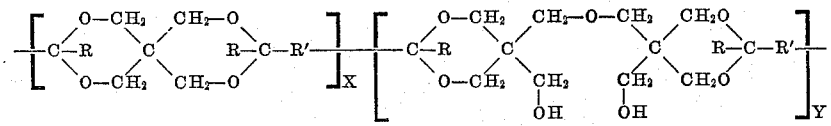

where R is taken from the group consisting of H and $CH_3$, R' is taken from the group consisting of aliphatic hydrocarbons defined by $(CH_2)_S$, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, cured at a temperature greater than 240° C. but not greater than about 400° C. in the presence of 0.05–1.0%, based on the weight of the polyspirane resin, of a non-volatile acid possessing an ionization constant greater than $3.8 \times 10^{-2}$.

2. A composition of matter as in claim 1 wherein the acid curing agent is selected from the group consisting of sulfuric acid, alkylsulfonic acids and arylsulfonic acids.

3. A composition of matter as in claim 1 wherein the polyspirane resin comprises the copolymer of (1) an aldehyde component selected from the class consisting of glutaraldehyde, 3-methylglutaraldehyde, terephthaldehyde, malonaldehyde and mixtures thereof, (2) with a mixture of from 50 to 88 parts by weight monopentaerythritol and from 12 to 50 parts dipentaerythritol.

4. A composition of matter as in claim 1 wherein the cured resin contains, for every 100 parts by weight of the polyspirane component, another component selected from the group consisting of:

(a) about 0.5–5 parts of a compound selected from the group consisting of the polymers of ethylene and halogenated derivatives thereof;
(b) 1 to 50 parts of a polyisocyanate ecompound;
(c) 4 to 25 parts of an epoxy resin having the general formula

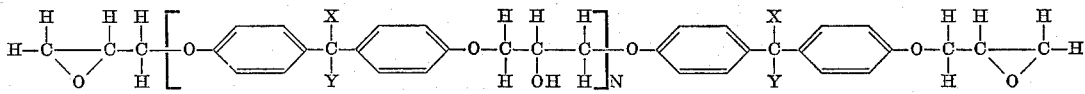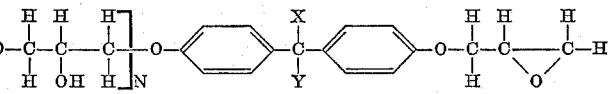

where X and Y are taken from the group consisting of hydrogen, methyl groups, aliphatic and aromatic hydrocarbons, and N is an integer from 0 to 10; and
(d) 1 to 25 parts of a phenolic aldehyde resin.

5. A composition of matter as in claim 4 wherein a polyisocyanate compound is selected which is the phenol adduct of the reaction product of one mol of trimethylol propane and 3 mols of tolylene diisocyanate.

6. A composition of matter as in claim 4 wherein epoxy resin is selected which is of the 2,2'-bis(p-hydroxyphenyl)propane-epichlorohydrin type.

7. A composition of matter as in claim 4 wherein a phenolic aldehyde resin is selected which is the reaction product of 1 mol of the phenolic compound with 0.7 to 2.0 mols of formaldehyde.

8. A process for the manufacture of a solid resinous product which comprises: (1) dissolving in a mixture of cresylic acid and a diluent therefor a polyspirane resin having the general formula

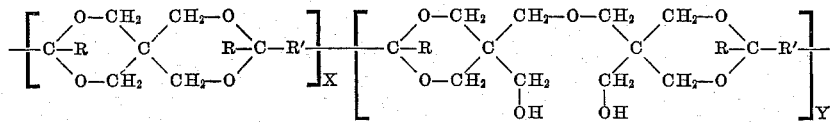

where R is taken from the group consisting of H and $CH_3$, R' is taken from the group consisting of aliphatic hydrocarbons defined by $(CH_2)_S$, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, (2) adding to the solution a catalytic amount of a soluble, nonvolatile acid with an ionization constant greater than $3.8 \times 10^{-2}$ and a soluble material selected from the group consisting of (a) about 0.5–5 parts of a compound selected from the group consisting of the polymers of ethylene and halogenated derivatives thereof;
(b) 1 to 50 parts of a polyisocyanate compound;
(c) 4 to 25 parts of an epoxy resin having the general formula

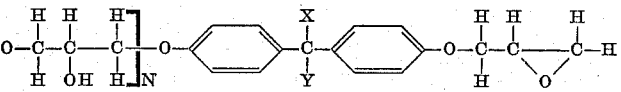

where X and Y are taken from the group consisting of hydrogen, methyl groups, aliphatic and aromatic hydrocarbons, and N is an integer from 0 to 10; and
(d) 1 to 25 parts of a phenolic aldehyde resin; and finally, removing the solvent and curing the mixture at a temperature greater than 240° C. but not greater than about 400° C.

9. A coating composition comprising an acid cured polyspirane system as in claim 1.

10. An electrical element composed of a conductor coated with a composition prepared according to the process of claim 8.

References Cited in the file of this patent

UNITED STATES PATENTS

| | | |
|---|---|---|
| 2,643,236 | Kropa et al. | June 23, 1953 |
| 2,739,972 | Abbott et al. | Mar. 27, 1956 |
| 2,785,996 | Kress | Mar. 19, 1957 |
| 2,895,945 | Fischer et al. | July 21, 1959 |